United States Patent [19]
Burch

[11] Patent Number: 6,014,515
[45] Date of Patent: Jan. 11, 2000

[54] ENHANCED STACK UNWIND FACILITY

[75] Inventor: Carl D. Burch, Cupertino, Calif.

[73] Assignee: Hewlett-Packard Company, Palo Alto, Calif.

[21] Appl. No.: 08/865,017

[22] Filed: May 29, 1997

[51] Int. Cl.[7] .................................................. G06F 9/45
[52] U.S. Cl. ............................................................ 395/704
[58] Field of Search ............................ 395/704, 705–709

[56] References Cited

U.S. PATENT DOCUMENTS

| | | | |
|---|---|---|---|
| 5,428,759 | 6/1995 | Smith et al. ................................. | 711/3 |
| 5,628,016 | 5/1997 | Kukol ......................................... | 395/704 |

OTHER PUBLICATIONS

Himelstein et al., "A RISC Approach to Runtime Exceptions", Summer Usenix '88, San Francisco, Jun. 20–24, pp. 239–249.

HP 3000/930 and HP 9000/840 Comptuers, Procedure Calling Conventions Manual, "Stack Unwinding", Jan. 31, 1991.

*Primary Examiner*—Alvin E. Oberley
*Assistant Examiner*—George Opie

[57] ABSTRACT

An enhanced unwind facility is more extensible, much faster, and uses smaller tables than presently known schemes. In broad terms, the unwind facility trades bytes that are used for addresses and region lengths in known schemes for a stream of bit fields parallel to the instruction stream. This arrangement allows an unwind library to compute a current regions' attributes by indexing instead of by a binary search. This arrangement also leads to an extensible design that does not require significant effort on an occurrence-by-occurrence basis in both the linker and the unwind library when additional services are required, e.g. register use areas for the debugging of optimized code.

33 Claims, 2 Drawing Sheets

ENHANCED STACK UNWIND FACILITY

BACKGROUND OF THE INVENTION

1. Technical Field

The invention relates to computer data structures. More particularly, the invention relates to an enhanced stack unwinding facility, for example, for use with such computer data structures as runtime exception handlers.

2. Description of the Prior Art

Many computer languages provide a procedure (referred to as an exception handler) that is executed when an unusual event (referred to as a runtime exception) occurs during program execution. The exception handler may print an error message or alter a global data structure. The exception handler may also execute a non-local "go to" instruction to allow the program flow to return an outer level procedure, such that the program may recover quickly from the error.

Each ordinary procedure in a program may provide a different exception handler. If a particular procedure fails to provide an exception handler, then that procedure inherits an exception handler from the procedure that called the failed procedure. The calling procedure may have in turn inherited its exception handler from a procedure by which it was called, and so on.

A particular procedure may be called from many different places in a program and may therefore use any number of different exception handlers.

Further, an exception may occur at a point in a program where a highly optimizing compiler has allocated variables to registers in a manner that is not discernible or known by the exception handler.

Stack unwinding refers to the process of procedure trackback and context restoration, for example in response to an unusual event during execution of a program, such as an exception. See, for example, HP 3000/930 and HP 9000/840 Computers—Procedure Calling Conventions Manual, Hewlett-Packard Corporation, Ch. 7 (January 1991).

Stack unwinding depends upon the ability of the system to determine the state of the stack for any given instruction, and whether that instruction is part of a procedure entry or exit sequence. When an exception occurs and the current procedure has not specified an exception handler, the runtime system must unwind the procedure call stack. That is, the runtime system must methodically undo the effect of each procedure call, e.g. by restoring registers and popping stack frames, until a desired outer-level procedure is reached that provides an exception handler. Thus, the runtime system must know the size of each frame and which registers were saved, e.g. because an optimizing compiler saves as few registers as possible in each frame.

The procedure calling mechanism for a complex instruction set computer (CISC) provides a frame pointer which, together with the stack pointer, indicates the frame size. Often, the stack frame contains a bit mask that indicates which registers were saved. Sometimes, another bit mask or pointer indicates exception handlers. In this case, stack unwinding and exception handling are relatively straightforward, although every procedure call incurs the computational expense of updating the frame pointer and manipulating the bit masks, even if the program never encounters an exception.

Similar issues arise in reduced instruction set computers (RISC). See, for example, M. Himelstein, S. Correll, K. Enderby, *A RISC Approach to Runtime Exceptions*, Summer USENIX '88, pp. 239–249 (June 1988). More significantly, RISC computers typically must infer the mechanism by which the program arrived at the point at which the exception is encountered. The state of the art provides a binary search mechanism that is computationally expensive.

It would be advantageous to provide a compact, easily implemented stack unwinding mechanism that does not significantly affect processor speed, e.g. that provides fast exception handling.

SUMMARY OF THE INVENTION

The invention provides an enhanced unwind facility. The unwind facility supports various optimizations, such as shrink wrapped register saves. The unwind facility provided herein is more extensible, much faster, and uses smaller tables than presently known schemes.

In broad terms, the unwind facility provided herein replaces bytes that are used for addresses and region lengths in known schemes, such as binary search schemes, with a stream of bit fields that are parallel to the instruction stream. This arrangement allows an unwind library to compute a current regions' attributes using indexing instead of a binary search. This arrangement also leads to an extensible design that does not require significant computational effort on an occurrence-by-occurrence basis in both the linker and the unwind library when additional services are required, e.g. register use areas for the debugging of optimized code.

DETAILED DESCRIPTION OF THE INVENTION

Figure 1:
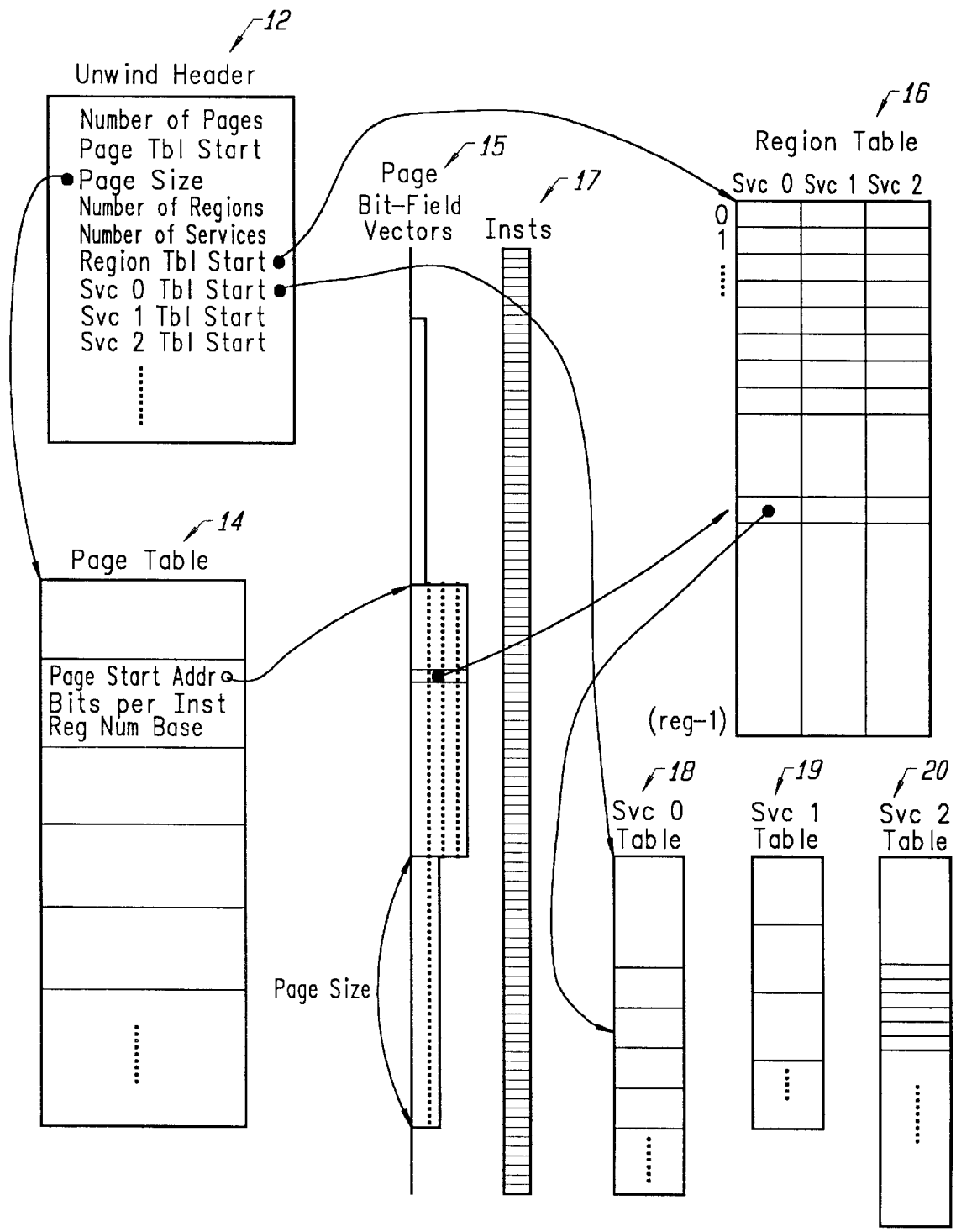
FIG. 1 is a block schematic diagram showing an enhanced unwinding facility for computer data structures according to the invention.

The invention provides an enhanced unwind facility. The unwind facility supports various optimizations, such as shrink wrapped register saves. The unwind facility provided herein is more extensible, much faster, and uses smaller tables than presently known schemes.

In broad terms, the unwind facility provided herein replaces bytes that are used for addresses and region lengths in known schemes with a stream of bit fields that are parallel to the instruction stream. This arrangement allows an unwind library to compute a current regions' attributes using indexing instead of a binary search. This arrangement also leads to an extensible design that does not require significant computational effort on an occurrence-by-occurrence basis in both the linker and the unwind library when additional services are required, e.g. register use areas for the debugging of optimized code.

Some advantages of this arrangement include:

Faster exception handling for those languages where unwinding is a major feature, e.g. C++, Ada, and Modcal.

Extensible to new functionalities without major linker or unwind library rework. Thus, the unwind service only needs to provide a library interface. The library interface only requires knowledge of new information that is to be used to the extent that the new information is to be invoked by the unwind library. The linker only has to add one routine to build that service's table entries.

Smaller storage requirements for unwind/recover information in most cases than that required by presently known facilities. The arrangement herein is thought to produce a structure that is more compact, especially in view of the greatly increased number of unwind regions that may result from the use of such features as shrink wrapped register saves.

Supports regions that are not contiguous in the text, e.g. line number regions for debugging optimized code, where the code is previously moved out of loops during optimization and, therefore, may be greatly distant from the rest of that source line's instructions.

Tables Design. The following are pseudo-code declarations for unwind tables, and for analogous services tables, that are used in a presently preferred embodiment of the invention. It will be appreciated by those skilled in the art that the actual implementation of such tables is dependent upon many factors, such as target architecture. The following tables should not be seen as limiting the scope of the invention to the specific pseudo-code declarations shown. The actual implementation of these tables is well within the skill of those practiced in the relevant art.

The pages described below are not operating system or architecturally defined pages, but are of a size chosen by the linker to minimize the table size to that sufficient for the number of regions and instructions in a particular a.out or shared library (e.g. a fixed number of instructions usually a power of 2). There is a tradeoff between page size and bit vector space. Larger pages span more logical regions and, therefore, require more bits per instruction, while smaller pages require more page descriptor records.

The page bit vectors and region tables are arrays of bit fields that are not represented directly in the C programming language, though they are readily written as bit offsets and lengths in a vector of bytes or words. The uppercase identifiers represent variable constants determined by, or derived from, the fields of the same name in the unwind header or page descriptor.

All offsets are in bytes from the start of the unwind_header in the file.

FIG. 1 is a block schematic diagram showing an enhanced unwind facility for computer data structures according to the invention. The structures shown on FIG. 1 correspond to those structures set forth in the pseudo-code declarations above. The invention is readily understood with reference to the pseudo-code declarations, FIG. 1, and in view of the following discussion.

With regard to FIG. 1 and the above pseudo-code declarations, the unwind header 12 corresponds to the table struct unwind_header, which sets forth the header structure at the start of the unwind table area. This table includes various fields, such as short num_pages, which is a count of the pages in the page table 14 (discussed below); short page_size, which is a count of the instructions in each page of the page table; short num_svcs, which is a count of the number of unwind services that are active in the program, e.g. unwind, recover, and Ada line numbers=>3; int page_tbl, which is the offset of the page table; int num_regs, which is a count of the number of unwind regions in the program; int reg_tbl, which is the offset of the region table; and int svc_base[NUM_SVCS], which is an array of offsets (preferably, word-aligned) of each service table, where there is one service table per active unwind service.

The unwind header 12 also provides a pointer to one or more service tables 18, 19, 20, referred to above as typedef struct svc_descr svc_table[SVC_N_LEN], which are (preferably word-aligned) service region attribute tables, each containing different lengths and types of entries. Each service table is appropriately called during an exception encountered during runtime, as discussed in more detail below.

The unwind header 12 also provides a pointer to a region table 16, referred to above as:

unsigned int region_descr[NUM_SVCS][NUM_REGS]:LOG2_OF_NUM_REGS.

The region table is structured to provide pointers to each of one or more of the service tables 18, 19, 20. The service

---

```
struct page_descr {/* each page's descriptor in the page table */
    int bit_field_arr_start; /* offset of each page's page_bits array of bit fields parallel to
that page's instructions, each entry containing the delta added to reg_num_base to give this
instruction's region number, */
        unsigned int num_bits_per_inst:8; /* bits per entry of the bit array */
        unsigned int reg_num_base:24; * base region number for this page's insts */
    }
struct unwind_header { /* header struct at start of unwind table area */
        short num_pages; /* count of pages in page table */
        short page_size; t* count of instructions in each page of page table */ short
num_svcs; /* count of unwind services active in the program, e.g. unwind, recover, and Ada
line numbers = > 3 */
        int page_tbl; /* offset of the page table */
        int num_regs; /* count of unwind regions in the program */
        int reg_tbl; /* offset of the region table */
        int svc_base[NUM_SVCS]; /* array of offset's (word-aligned) of each
            service table, one per active unwind service.*/
        ...
    }
typedef unsigned int page_bits[PAGE_SIZE]:NUM_BITS_PER_INST;
            /* array of bit fields big enough to hold the number of
            regions referenced by this page of code, one per
            instruction */
struct page_descr page_table[NUM_PAGES];/* page table, word-aligned in file */
unsigned int region_descr[NUM_SVCS][NUM_REGS]:LOG2_OF_NUM_REGS;/*
            region table */
typedet struct svc_descr svc_table[SVC_N_LEN];/* word-aligned service region
            attribute tabte(s), each with different lengths and types of entries */
``` table likewise provide various unwind services for corresponding regions.

The page table 14 referenced in the unwind header 12, struct page_descr page_table[NUM_PAGES] is a (preferably word-aligned) table that includes each page's descriptor. Such descriptors may include int bit_field_arr_start, which is an offset of each page's page_bits array of bit fields that are parallel to that page's instructions, where each entry contains an offset that is added to reg_num_base to give the instruction's region number; unsigned int num_bits_per_inst:N, which provides the number of bits per entry N, e.g. 8 bits, of the bit array; and unsigned int reg_num_base:M, which is the base region number M, e.g. region 24, for the page's instruction stream. For purposes of the discussion herein, reg_num_base is the base value for that page's range of region numbers. Because the bit-vector fields only represent 0 . . . $2^n$ values and the region numbers range is much larger, the offset makes up the difference. For example, a page with instructions whose unwind regions are numbered 47 to 53 uses three bits to represent 0 . . . 6 and has a reg_num_base of 47.

The page table 14 provides a pointer to a series of page bit-field vectors 15, referred to above as:

typedef unsigned int page_bits[PAGE_SIZE]:NUM_BITS_PER_INST, which comprise an array of bit fields. The array of bit fields is necessarily large enough to hold the number of regions contained in the regions table 16, where the regions are referenced by a particular page of code (as shown by the pointer to the regions table 16). There is one field per instruction.

In these vectors, each page is of a defined length and contains a fixed number of instructions. There may be one or more associated unwind regions for each instruction (up to the actual number of instructions), where the number of bits in the bit vector are determined by the number of unwind regions. Thus, a vector of three "dots" is shown on FIG. 1 representing the index of a portion of the region table 16 where three unwind services Svc 0, Svc 1, Svc 2 are available.

In this example, the exception raises a call to the unwind services provided by Svc 0 18. The unwind header table 12 provides a reference to the start of the service table Svc 0, while the page table 14 provides a reference to the page bit-field vectors 15. The instruction offset in the page bit-field vectors provides a reference to a corresponding position in the region table 16, and thence to the relevant entry in the unwind service table Svc 0.

The instruction stream 17 is also shown in FIG. 1. The instructions in the page bit field vectors are segmented into pages. FIG. 1 shows that each instruction in the instruction stream has a corresponding entry in the array of page bit-field vectors. Thus, when an exception is raised for any instruction encountered during runtime, the invention indexes to an appropriate entry in an unwind service table. In this way, the mechanism herein provides fast resolution of an exception by indexing directly to an unwind service table for that instruction.

Thus, the basic algorithm replaces a current binary search on an entire 32-bit program counter value (in the case of a 32-bit architecture) with a paged scheme that turns masked-off parts of the procedure call value into table indices, thereby replacing a log-n binary search with a constant time table lookup. In the presently preferred embodiment of the invention, the data structures in memory are substantially the same as those shown in FIG. 1.

Part of the space efficiency provided by the invention results from removing position dependent code address information from application dependent attributes. This allows compression, for example for regular unwind, where many sets of region attributes are identical, except for the region address and length. Such compression is shown by the simulation results on FIG. 2.

Extensibility. This invention enhances extensibility by providing a parameterized fixup that marks a region in the program for a particular service. The arguments for the fixup may include, e.g. the service number, which is assigned by the provider of the linker and unwind service routine library because the linker must know the type of table entry to build in the service table, and may include an arbitrary logical region number. The fixups' region number is not used in the final data structure, but it provides a means of expressing the fact that disjoint instruction regions belong to the same logical region for that unwind service.

Figure 2:
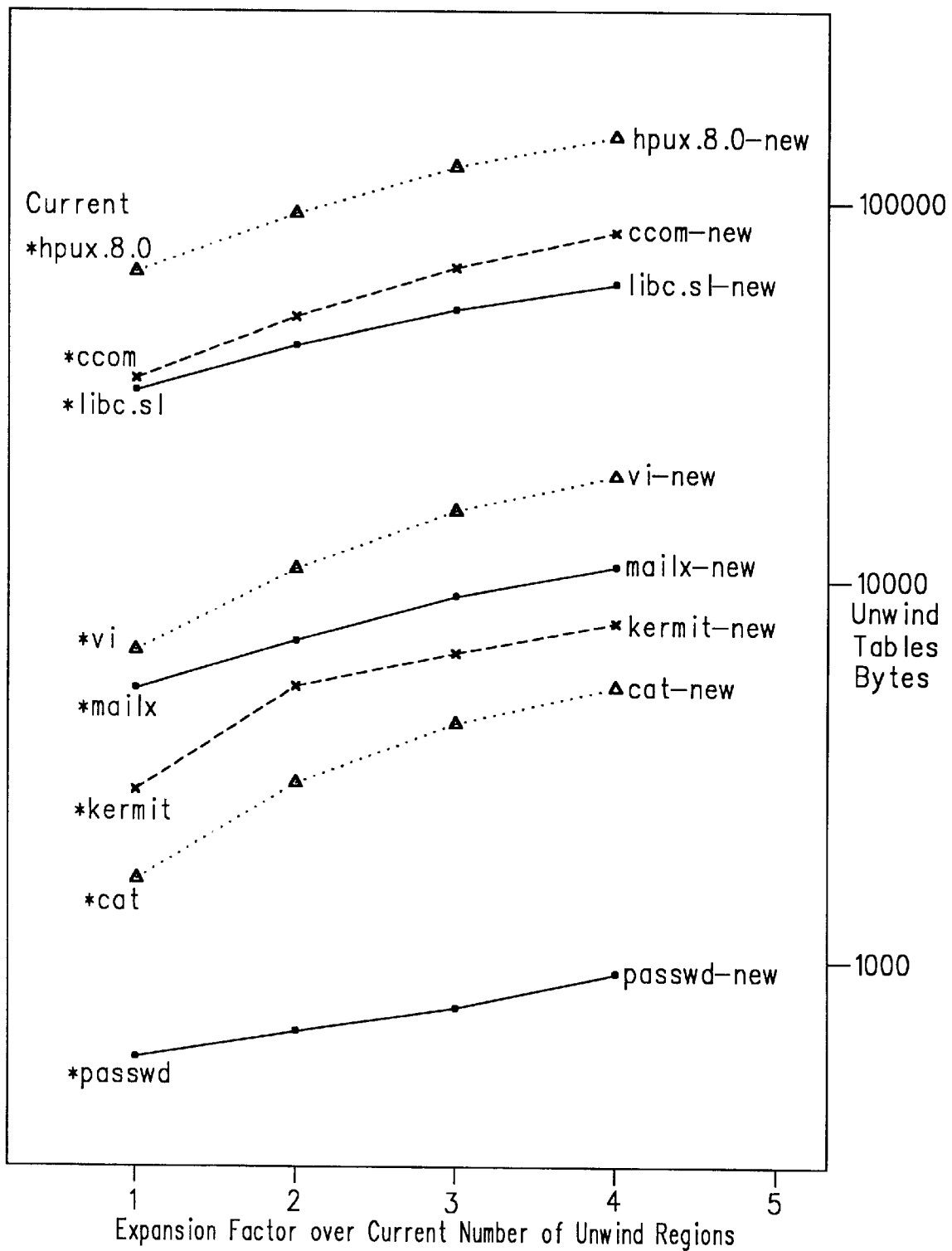
FIG. 2 is a graph that plots unwind table sizes under various expansion factors.

Simulation Results. FIG. 2 is a graph that plots unwind table sizes under various expansion factors, comparing two table designs, according to the invention. Current unwind information was taken from several applications spanning a large range of sizes. The size of the unwind tables was simulated for a state of the art unwind scheme and the scheme herein disclosed. The effect of changes in code generation, such as shrink wrapping, that would multiply the number of non-stub unwind regions by some large factor without changing functionality was projected.

For purpose of the discussion herein, FIG. 2 depicts the results of the above simulation. Note that the current scheme's actual table size is represented by the asterisks at the left of the graph because such scheme cannot describe optimizations, such as shrink wrapping. For example, if shrink wrapping were available for such scheme, then a linear plot would be produced in which the value would increase by the expansion. Also, note the logarithmic scale for table sizes. It can be seen from FIG. 2 that the growth in table size is very fast as the number of regions increases in a given number of instructions, but that storage requirements are substantially reduced by the invention.

Support for Debugging Optimized Code. Debuggers must solve the reverse of the usual unwind problem to set breakpoints at specific line numbers. It is desirable to use existing unwind data structures, rather than replicating similar information in debug tables. The following is one embodiment of an algorithm that supports this requirement atop the new bit-field data structures according to the invention.

For purposes of this discussion, it is assumed the region defined by the debug service is in fact the line number or other lowest level of granularity for setting a breakpoint. This assumption is made because a field is used in the debug table to hold the corresponding region table index. This implies that the mapping of debug table entries to regions is not many-to-one, though many debug table entries could refer to the same region table entry with no loss of information.

Input: function name and line number.

Output: series of instruction addresses associated with the input line number.

Use name and line number to look up region number stored in debug table.

Look up the function base address in the symbol table.

Get the function length by subtracting the next function's address.

Map start address and length to one or more page table entries.

For each page table entry "j":

```
biased_entry_val=region #-reg_num_base;
for i=0 to page_size-1
    if bit_field_entry[i]==biased_entry_val output
        (page_start_addr[j]+(I*WORDSIZE));
```

It is possible to use the region table indices, as opposed to the contents of the region table entry, as an input to the service routines. This provides the line number with only the source file name and the region-number-to-line-number offset necessarily present in the service table.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. An enhanced unwind apparatus for exceptions encountered during program runtime, comprising:
   an unwind library comprising at least one unwind service;
   at least one indexed table for replacing bytes that are used for addresses and region lengths with a stream of bit fields where each instruction in an instruction stream has a corresponding entry in said at least one indexed table, wherein said unwind library computes a current regions' attributes using indexing provided by said at least one indexed table, and
   an unwind header table struct unwind header having a structure that includes one or more of the following descriptors:
      short num pages;
      short page size;
      short num svcs;
      int page tbl;
      int num regs;
      int reg tbl;
      int svc base;
   where:
      short num pages is a count of the pages in a page table;
      short page size is a count of instructions in each page of said page table;
      short num svcs is a count of the number of unwind services that are active in said program;
      int page tbl is an offset of said page table;
      int num regs is a count of the number of unwind regions in said program; int reg tbl is the offset of a region table; and
      int svc base is an array of offsets of each service table, where there is one service table per active unwind service.

2. The apparatus of claim 1, further comprising:
   a page table struct page_descr page_table having a structure that includes one or more of the following descriptors struct page_descr:
      int bit_field_arr_start;
      unsigned int num_bits_per_inst:8;
      unsigned int reg_num_base:24;
   where:
      int bit_field_arr_start is an offset of each page's page_bits array of bit fields that are parallel to that page's instructions, where each entry contains an offset identify an instruction's region number;
      unsigned int num_bits_per_inst:N provides a number of bits per entry N of a bit array; and
      unsigned int reg_num_base:M is a base region number M for a page's instruction stream.

3. The apparatus of claim 2, further comprising:
   one or more service tables; and
   a regions table that provides pointers into said one or more service tables, wherein said service tables provide unwind service data for corresponding regions.

4. The apparatus of claim 3, said one or more service tables further comprising:
   service region attribute tables, each with different lengths and types of entries;
   wherein an appropriate service table is read during an exception encountered during program runtime.

5. The apparatus of claim 3, further comprising:
   an array of page bit-field vectors for holding the indices of regions in said regions table that are referenced by a particular page of said program, where there is one field in said array per program instruction.

6. The apparatus of claim 5, each vector in said array of page bit-field vectors further comprising:
   one or more bits in said bit vector, where the number of bits in the bit vector is determined by the number of unwind regions.

7. The apparatus of claim 5, wherein instructions in said page bit-field vectors are segmented into pages.

8. The apparatus of claim 5, wherein each instruction in an instruction stream has a corresponding entry in said array of page bit-field vectors.

9. The apparatus of claim 1, wherein an exception raised for any instruction encountered during runtime indexes to an appropriate entry in an unwind service table.

10. The apparatus of claim 1, wherein masked-off parts of a program counter value are turned into table indices.

11. The apparatus of claim 1, further comprising:
    a parameterized fixup for marking a region in said program for a particular service.

12. The apparatus of claim 11, wherein arguments for said fixup may include a service number and an arbitrary logical region number.

13. The apparatus of claim 3, wherein disjoint instruction regions belong to the same logical region for a particular unwind service.

14. The apparatus of claim 1, wherein a region defined by a debug service comprises the lowest level of granularity for setting a breakpoint.

15. The apparatus of claim 14, wherein a field is used in said debug service table to hold a corresponding region table index.

16. A method for debugging optimized code in which an input is a function name and line number, and in which an output is a series of instruction addresses associated with said input line number, the method comprising the steps of:
    providing an unwind library comprising at least one unwind service;
    providing indexed tables for replacing bytes that are used for addresses and region lengths with a stream of bit fields, where each instruction in an instruction stream has a corresponding entry in said at least one indexed table, wherein said unwind library computes a current regions' attributes using indexing provided by said indexed tables;
    using said function name and line number to look up region number stored in a debug table coomprised of one of said indexed tables;
    looking up a function base address in a symbol table coomprised of a second one of said indexed tables;
    getting function length by subtracting a next function's address; and mapping a start address and length to one or more page table entries, wherein said page table is coomprised of a third one of said indexed tables.

17. The method of claim 6, wherein for each page table entry "j" the breakpoint addresses are computed substantially in accordance with the following:

biased_entry_val=region #−reg_num_base;

for i=0 to page_size−1 if bit_field_entry[i]==biased_entry_val output (page_start_addr[j]+(I*WORDSIZE)).

18. An enhanced unwind method for exceptions encountered during program runtime, comprising the steps of:

providing an unwind library comprising at least one unwind service;

providing at least one indexed table for replacing bytes that are used for addresses and region lengths with a stream of bit fields that are parallel to an instruction stream, wherein said unwind library computes a current regions' attributes using indexing provided by said at least one indexed table; and providing an unwind header table struct unwind header having a structure that includes one or more of the following descriptors:

short num pages;
short page size;
short num svcs;
int page tbl;
int num regs;
int reg tbl;
int svc base;

where:

short num pages is a count of the pages in a page table;

short page size is a count of instructions in each page of said page table short num svcs is a count of the number of unwind services that are active in said program;

int page tbl is an offset of said page table;

int num regs is a count of the number of unwind regions in said program; int reg tbl is the offset of a region table; and int svc baser is an array of offsets of each service table, where there is one service table per active unwind service.

19. The method of claim 18, further comprising the step of:

providing a page table struct page_descr page_table having a structure that includes one or more of the following descriptors struct page_descr:

int bit_field_arr_start;
unsigned int num_bits_per_inst:8;
unsigned int reg_num_base:24;

where:

int bit_field_arr_start is an offset of each page's page_bits array of bit fields that are parallel to that page's instructions, where each entry contains an offset identify an instruction's region number;

unsigned int num_bits_per_inst:N provides a number of bits per entry N of a bit array; and unsigned int reg_num_base:M is a base region number M for a page's instruction stream.

20. The method of claim 19, further comprising the step of:

providing one or more service tables; and a regions table that provides pointers into sdiad one or more service tables, wherein said service tables provide unwind service data for corresponding regions.

21. The method of claim 20, said one or more service tables further comprising:

service region attribute tables, each with different lengths and types of entries;

wherein an appropriate service table is called during an exception encountered during program runtime.

22. The method of claim 20, further comprising the step of:

providing an array of page bit-field vectors for holding the indices of regions in said regions table that are referenced by a particular page of said program, where there is one field in said array per program instruction.

23. The method of claim 22, each vector in said array of page bit-field vectors further comprising:

one or more bits in said bit vector, where the number of bits in the bit vector is determined by the number of unwind regions.

24. The method of claim 22, wherein instructions in said page bit-field vectors are segmented into pages.

25. The method of claim 22, wherein each instruction in an instruction stream has a corresponding entry in said array of page bit-field vectors.

26. The method of claim 18, wherein an exception raised for any instruction encountered during runtime indexes to an appropriate entry in an unwind service table.

27. The method of claim 18, wherein masked-off parts of a program counter value are turned into table indices.

28. The method of claim 18, further comprising the step of:

providing a parameterized fixup for marking a region in said program for a particular service.

29. The method of claim 28, wherein arguments for said fixup may include a service number and an arbitrary logical region number.

30. The method of claim 20, wherein disjoint instruction regions belong to the same logical region for a particular unwind service.

31. The method of claim 18, wherein a region defined by a debug service comprises the lowest level of granularity for setting a breakpoint.

32. The method of claim 31, wherein a field is used in said debug service table to hold a corresponding region table index.

33. The method of claim 18, further comprising the step of:

using region table indices as an input to said unwind service routines.

* * * * *

UNITED STATES PATENT AND TRADEMARK OFFICE
CERTIFICATE OF CORRECTION

PATENT NO.   : 6,014,515
DATED        : January 11, 2000
INVENTOR(S)  : Carl D. Burch It is certified that error appears in the above-identified patent and that said Letters Patent is hereby corrected as shown below:

Column 8,
Line 62, delete "coomprised" and insert therefor -- comprised --
Line 65, delete "coomprised" and insert therefor -- comprised --

Column 9,
Line 2, delete "coomprised" and insert therefor -- comprised --
Line 4, delete "claim 6" and insert therefor -- claim 16 --
Line 42, delete "int svc baser" and insert therefor -- int svc base --

Column 10,
Line 7, delete "sdiad" and insert therefor -- said --

Signed and Sealed this

Sixteenth Day of July, 2002

*Attest:*

JAMES E. ROGAN
*Attesting Officer*        *Director of the United States Patent and Trademark Office*